United States Patent
Tamagawa

[19]
[11] Patent Number: 6,154,298
[45] Date of Patent: Nov. 28, 2000

[54] OPTICAL COMMUNICATION DEVICE

[75] Inventor: Toshimitsu Tamagawa, Kyoto, Japan

[73] Assignee: Rohm Co., Ltd., Kyoto, Japan

[21] Appl. No.: 08/834,362

[22] Filed: Apr. 16, 1997

[30] Foreign Application Priority Data

Apr. 19, 1996 [JP] Japan ..................... 8-098024

[51] Int. Cl.⁷ .............................................. H04B 10/00
[52] U.S. Cl. ........................................ 359/152; 359/154
[58] Field of Search ........................... 359/154, 160, 359/163, 172, 152, 113, 162, 180, 181, 188, 189, 195; 385/14; 372/29, 45, 50

[56] References Cited

U.S. PATENT DOCUMENTS

| | | | |
|---|---|---|---|
| 3,611,167 | 10/1971 | Calfee | 329/106 |
| 4,626,878 | 12/1986 | Kuwano et al. | 357/19 |
| 5,040,242 | 8/1991 | Tsuchiya et al. | 359/154 |
| 5,047,835 | 9/1991 | Chang | 357/74 |
| 5,122,893 | 6/1992 | Tolbert | 359/152 |
| 5,337,391 | 8/1994 | Lebby | 385/88 |
| 5,422,931 | 6/1995 | Austin-Lazarus et al. | 379/59 |
| 5,432,630 | 7/1995 | Lebby et al. | 359/152 |

*Primary Examiner*—Jason Chan
*Assistant Examiner*—Dalzid Singh
*Attorney, Agent, or Firm*—Hoffman & Baron, LLP

[57] ABSTRACT

An optical communication device includes an IrDA modulation circuit and an ASK modulation circuit, one of which modulates transmission data. Modulated data is applied to a driver which drives a light emission diode (LED) in accordance with the modulated data. On the other hand, reception data received by a photo-diode is amplified by an amplifier, and reception data outputted from the amplifier is demodulated by an IrDA demodulation circuit or an ASK demodulation circuit. The IrDA modulation circuit, the ASK modulation circuit, the IrDA demodulation circuit and the ASK demodulation circuit are formed by an MOS process, and the driver and the amplifier are formed by a bipolar process. The MOS process and the bipolar process are executed on the same substrate, whereby such circuits are incorporated into a single IC. The IC, the LED and the photo-diode are molded by a resin.

11 Claims, 3 Drawing Sheets

OPTICAL COMMUNICATION DEVICE

BACKGROUND OF THE INVENTION

1. Field of the Invention

The present invention relates to an optical communication device. More specifically, the present invention relates to an optical communication device in which data modulated by a modulation circuit is transmitted by a light emission element, and data received by a light reception element is demodulated by a demodulation circuit.

2. Description of the Prior Art

In conventional such a kind of optical communication device 1 shown in FIG. 4, a driver 3 drives a light emission diode (LED) 4 in accordance with transmission data outputted from a logic IC 2, whereby the data is transmitted as an optical signal. Furthermore, reception data received by a photo-diode 5 is amplified by an amplifier 6, and amplified reception data is processed by the logic IC 2.

However, in such a prior art, since signal lines connecting respective elements are exposed, the signal lines are easily affected by noises from an outside, and therefore, there is a problem that an S/N ratio is decreased.

SUMMARY OF THE INVENTION

Therefore, a principal object of the present invention is to provide a novel optical communication device.

Another object of the present invention is to provide an optical communication device capable of improving an S/N ratio.

According to the present invention, an optical communication device comprises: a light emission element for data transmission; modulation means for modulating transmission data; driving means for driving the light emission element in accordance with transmission data modulated by the modulation means; a light reception element for data reception; amplifying means for amplifying reception data received by the light reception element; demodulation means for demodulating reception data amplified by the amplifying means; and a package for packing the light emission element, the modulation means, the driving means, the light reception element, the amplifying means and the demodulation means.

According to the present invention, the light emission element, the modulation means, the driving means, the light reception element, the amplifying means and the demodulation means are packed into a single package.

In an aspect of the present invention, detection means detects the data transmission, and disabling means substantially disables the demodulation means in response to a detection output of the detection means. In an embodiment of this aspect, the disabling means includes a gate, and reception data demodulated by the demodulation means is gated by the gate in response to the detection output of the detection means.

In another aspect of the present invention, the modulation means, the demodulation means, the driving means and the amplifying means are formed in a single IC chip by a Bi-CMOS process, and the light emission element and the light reception element are arranged with an interval. In an embodiment of this aspect, the IC chip is bonded onto a first die pad, the light emission element is bonded onto a second die pad, and the light reception element is bonded onto a third die pad. The first die pad is put between the second die pad and the third die pad, whereby the light emission element and the light reception element are arranged with the interval.

In a further aspect of the present invention, the modulation means includes an IrDA modulation circuit, an ASK modulation circuit and a first switch for selecting one of the IrDA modulation circuit and the ASK modulation circuit. The demodulation means includes an IrDA demodulation circuit, an ASK demodulation circuit and a second switch for selecting one of the IrDA demodulation circuit and the ASK demodulation circuit. Control means controls the first switch and the second switch.

According to the present invention, since all the elements constituting the optical communication device are packed into the single package, noises are prevented from entering from an outside, whereby an S/N ratio can be improved.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
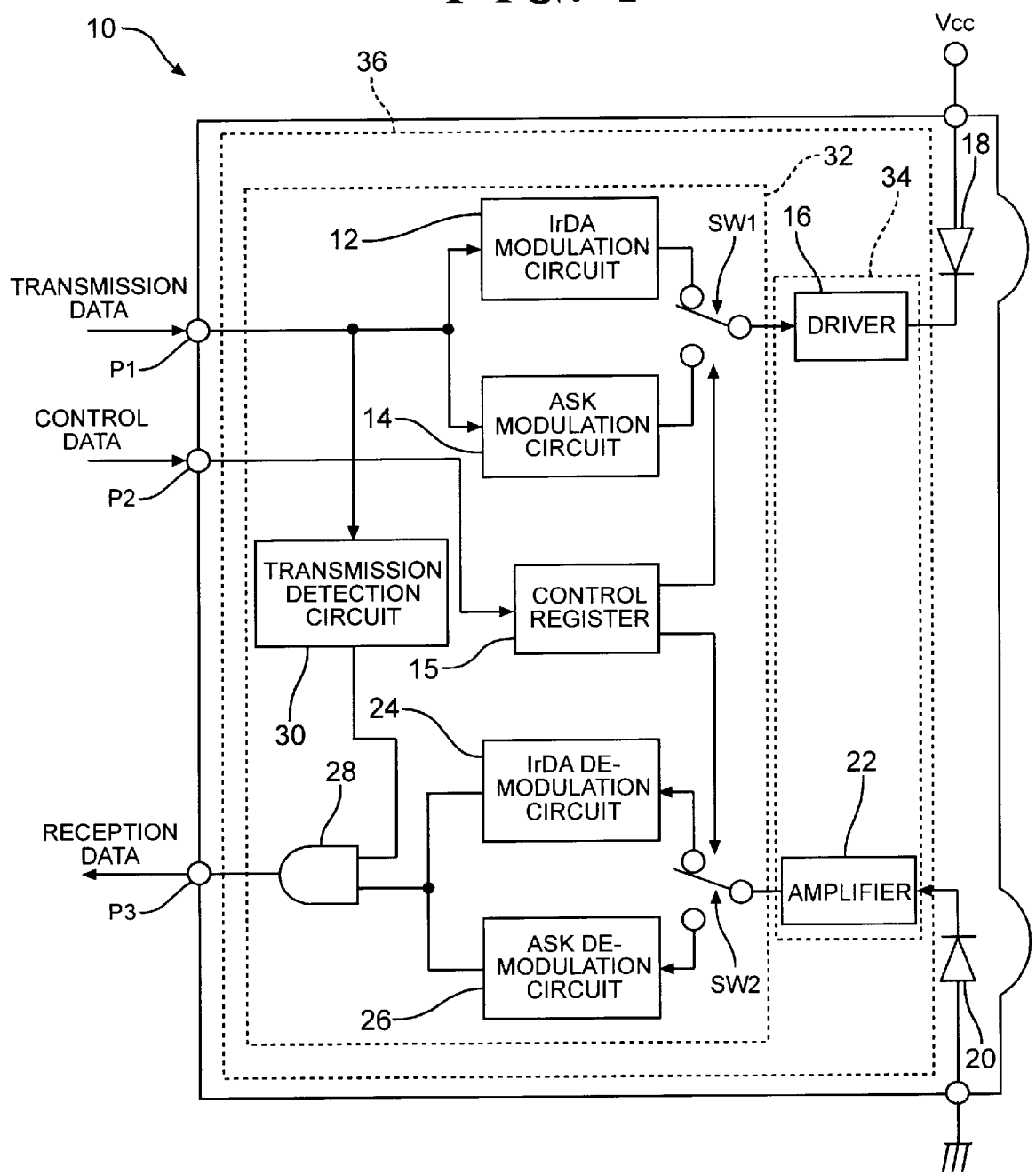
FIG. 1 is a block diagram showing one embodiment of the present invention.

An optical communication device 10 of this embodiment shown in FIG. 1 includes a terminal P1 for receiving transmission data. The transmission data inputted through the terminal P1 is applied to an IrDA modulation circuit 12 and an ASK modulation circuit 14. A switch SW1 is controlled by a switching signal from a control register 15, and therefore, modulated data modulated by an IrDA system or modulated data modulated by an ASK system is selected by the switch SW1. The modulated data outputted from the switch SWI is applied to a driver 16 which drives a light emission diode (LED) 18 in accordance with the modulated data. Therefore, an optical signal or an infrared light signal is transmitted.

On the other hand, a photo-diode 20 receives an optical signal or an infrared light signal transmitted from an outside, and converts the infrared light signal into an electric signal. The electric signal, i.e. modulated reception data is amplified by an amplifier 22, and an output of the amplifier 22 is inputted to an IrDA demodulation circuit or an ASK demodulation circuit through a switch SW2. The switch SW2 is also controlled by the switching signal from the control register 15. That is, the optical communication device 10 of this embodiment is able to perform optical communication by one of an IrDA system and an ASK system. The control register 15 controls both the switches SWI and SW2 so as to select a modulation circuit and a demodulation circuit having the same system in accordance with control data inputted through a terminal P2.

Reception data demodulated by the IrDA demodulation circuit 24 or the ASK demodulation circuit 26 is outputted from a terminal P3 through an AND gate 28. More specifically, the reception data is gated by the AND gate 28 in response to a detection signal from a transmission detection circuit 30 which detects that the transmission data is being transmitted by the LED 18. The IrDA demodulation circuit 24 and the ASK demodulation circuit 26 are substantially disabled by the detection signal. Accordingly, even if the photo-diode 20 erroneously receives the infrared light signal transmitted from the LED 18, no data is outputted from the AND gate 28 which is closed by the detection signal.

The IrDA modulation circuit 12, the ASK modulation circuit 14, the control register 15, the IrDA demodulation circuit 24, the ASK demodulation circuit 26, the switches SW1 and SW2, the transmission detection circuit 30 and the AND gate 28 are formed in a digital IC 32 by a MOS process, and the driver 16 and the amplifier 22 are formed in an analog IC 34 by a bipolar process. The digital IC 32 and the analog IC 34 are, in fact, at once manufactured by a Bi-CMOS process, whereby an IC chip 36 in which the digital IC 32 and the analog IC 34 are incorporated is obtained.

Thus, by grouping of digital elements and analog elements, respectively, it is possible to improve a noise resistance. Furthermore, since the driver 34 drives the LED 18 with a relatively large current whereby a noise is easily generated, the amplifier 22 is arranged with an interval from the driver 16 so as not to be affected by the noise. In addition, electric powers may be individually supplied to the driver 16 and the amplifier 22 so that an influence of the noise can be prevented from acting on the amplifier 22.

Figure 2:
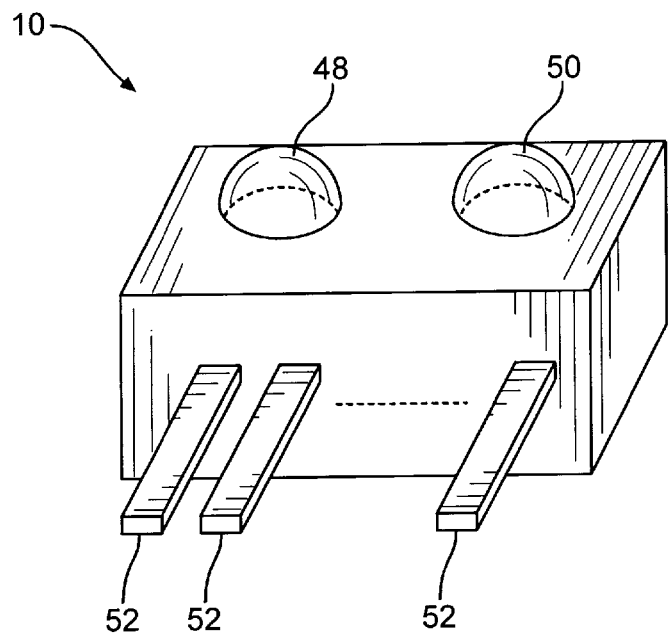
FIG. 2 is a perspective showing FIG. 1 embodiment.
Figure 3:
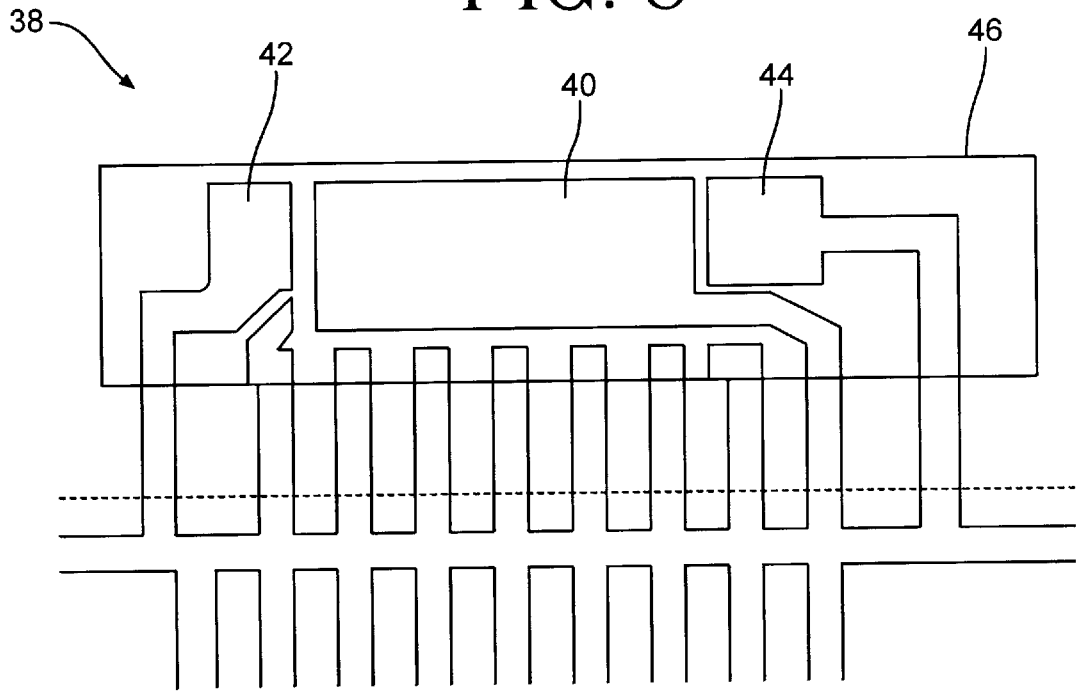
FIG. 3 is an illustrative view showing a portion of FIG. 1 embodiment.
Figure 4:
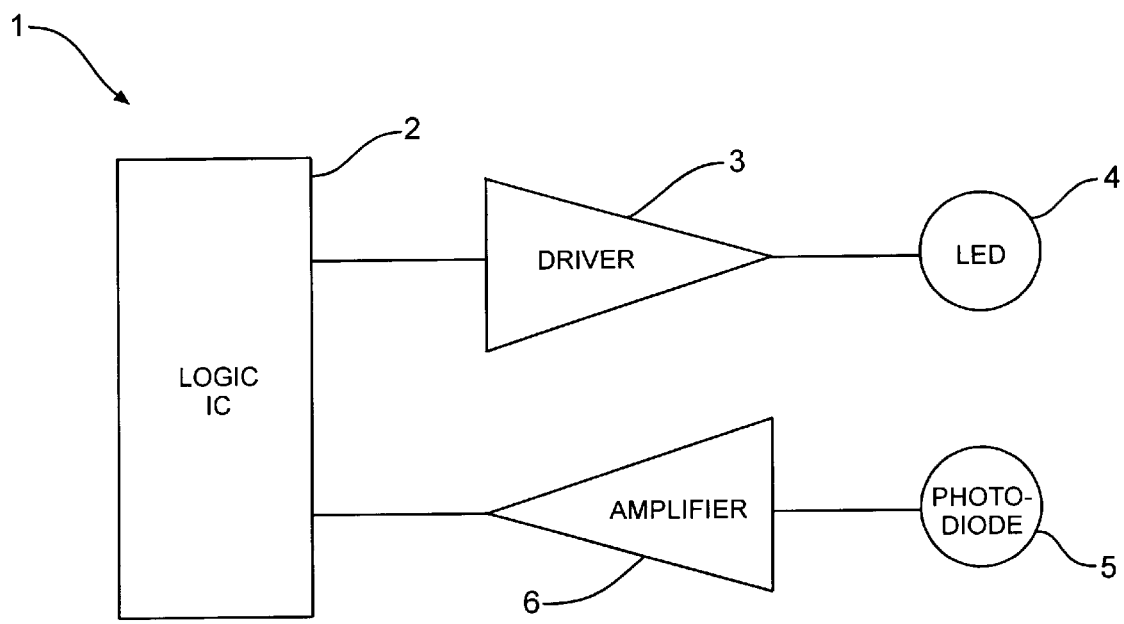
FIG. 4 is a block diagram showing a prior art.

The IC chip 36 is die-bonded onto a die pad 40 formed in a lead frame 38 shown in FIG. 3, and the LED 18 and the photo-diode 20 are respectively die-bonded onto die pads 42 and 44 formed at both sides of the die pad 40. Thereafter, the IC chip 36, the LED 18 and the photo-diode 20 are wire-bonded as necessary, and then, molded by a transparent epoxy resin 46, for example. At this time, lenses 48 and 50 are formed above the LED 18 and the photo-diode 20 by the transparent epoxy resin 46 as shown in FIG. 2. Then, by cutting the lead frame 38 at a position of a dotted line shown in FIG. 3, the optical communication device 10 which has a plurality of leads 52 exposed at an outside as shown in FIG. 2 is obtained. In addition, the transparent epoxy resin 46 may be further molded by an opaque epoxy resin excluding the lenses 48 and 50.

Since die pads 42 and 44 on which the LED 18 and the photo-diode 20 are mounted are electrically independent from each other as in FIG. 3, it is not needed to match a conductivity type of a substrate constituting the LED 18 with a conductivity type of a substrate constituting the photo-diode 20. Accordingly, a degree of freedom of design is improved, and most suitable light emission element and light reception element can be selected for the IC chip 36. Especially, by adapting a pin diode as the photo-diode 20, a quick response is obtained. In such a case, a substrate of the pin diode is made as an n type and a substrate of the IC chip 36 is made as a p type, whereby a characteristic deterioration can be prevented. Furthermore, since the IC chip 36 is put between the LED 18 and the photo-diode 20, it is possible to prevent an interference between the LED 18 and the photo-diode 20.

Thus, since the IC chip 36, the LED 18 and the photo-diode 20 are packed with a single package, no signal lines connecting respective elements are exposed, and therefore, it is possible to prevent an influence due to noises from an outside on the respective elements. Furthermore, since the lenses 48 and 50 are integrally formed, directivities of the LED 18 and the photo-diode 20 can be stabilized. Even more, since all the elements are packed with the single package, a size can be miniaturized. An actual size is, for example, 12 mm×5.5 mm×4.5 mm which is ¼ to ⅕ of the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical communication device, comprising:
   a light emission element for data transmission;
   a light reception element for data reception;
   an IC chip including modulation means for modulating transmission data, driving means for driving said light emission element in accordance with transmission data modulated by said modulation means, amplifying means for amplifying reception data received by said light reception element, demodulation means for demodulating reception data amplified by said amplifying means, detection means for detecting said data transmission, disabling means for substantially disabling said demodulation means in response to a detection output of said detection means; and
   a resin package for molding said light emission element, said IC chip and said light reception element, said resin package having light-transparent portions arranged in front of said light emission element and light reception element.

2. An optical communication device according to claim 1, wherein said disabling means includes gating means for gating reception data demodulated by said demodulation means in response to said detection output.

3. An optical communication device according to claim 1, wherein said modulation means includes first modulation means for modulating said transmission data by a first transmission method, second modulation means for modulating said transmission data by a second modulation method, and first selection means for selecting one of said first modulation means and said second modulation means, and
   said demodulation means includes first demodulation means for demodulating said reception data by a first demodulation method, second demodulation means for demodulating said reception data by a second demodulation method, and second selection means for selecting one of said first demodulation means and said second demodulation means, said device further comprising;
   control means for controlling said first selection means and said second selection means.

4. An optical communication device according to claim 1, wherein said IC chip includes a digital portion which is formed by a MOS process and contains said modulation means and said demodulation means and an analog portion which is formed by a bipolar process and contains said driving means and said amplifying means.

5. An optical communication device according to claim 4, wherein said light emission element and said light reception element are arranged with an interval such that said light reception element receives no light emitted by said light emission element.

6. An optical communication device according to claim 5, having a lead frame comprising:
   a first die pad on which said IC chip is bonded;
   a second die pad on which said light emission element is bonded and which is independent from said first die pad; and
   a third die pad on which said light reception element is bonded and which is independent from said first die pad and said second die pad, wherein said first die pad is formed between said second die pad and said third die pad.

7. An optical communication device according to claim 4, wherein said digital portion and said analog portion are formed substantially at once by a Bi-MOS process.

8. An optical communication device according to claim 1, wherein said modulation means includes a first modulation means for modulating said transmission data by a first transmission method, second modulation means for modulating said transmission data by a second modulation method, and first selection means for selecting one of said first modulation means and said second modulation means, and said demodulation means includes first demodulation means for demodulating said reception data by a first demodulation method, second demodulation means for demodulating said reception data by a second demodulation method, and second selection means for selecting one of said first demodulation means and said second demodulation means, said device further comprising:

control means for controlling said first selection means and said second selection means.

9. An optical communication device, comprising:

a light emission element for data transmission;

a light reception element for data reception;

an IC chip including:
  modulation means for modulating transmission data;
  driving means for driving said light emission clement in accordance with transmission data modulated by said modulation means;
  amplifying means for amplifying reception data received by said light reception element;
  demodulation means for demodulating reception data amplified by said amplifying means;
  detection means for detecting said data transmission; and
  disabling means for substantially disabling said demodulation means in response to a detection output of said detection means, said disabling means including gating means for gating reception data demodulated by said demodulation means in response to said detection output;

a resin package for molding said light emission element, said IC chip and said light reception element, said resin package having light-transparent portions arranged in front of said light emission element and light reception element; and wherein said IC chip includes:
  a digital portion which is formed by a MOS process and contains said modulation means, said demodulation means, said detection means, and said disabling means; and
  an analog portion which is formed by a bipolar process and contains said driving means and said amplifying means.

10. An optical communication device according to claim 9, wherein said light emission element and said light reception element are arranged with an interval such that said light reception element receives no light emitted by said light emission element.

11. An optical communication device according to claim 10, farther comprising:

a first die pad on which said IC chip is bonded;

a second die pad on which said light emission element is bonded and which is independent from said first die pad; and a third die pad on which said light reception element is bonded and which is independent from said first die pad and said second die pad, wherein said first die pad is formed between said second die pad and said third die pad.

* * * * *